US012307260B2

(12) United States Patent
Chen et al.

(10) Patent No.: US 12,307,260 B2
(45) Date of Patent: May 20, 2025

(54) DISPLAYING CONTENT TRANSMITTED BY AN EXTERNAL DEVICE BASED ON DETECTION OF A CONNECTED STATE BY DISPLAY FIRMWARE

(71) Applicant: REALTEK SEMICONDUCTOR CORP., Hsinchu (TW)

(72) Inventors: Yi-Cheng Chen, Hsinchu (TW); Yao-Ching Chiu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 169 days.

(21) Appl. No.: 18/097,069

(22) Filed: Jan. 13, 2023

(65) Prior Publication Data

US 2023/0418621 A1 Dec. 28, 2023

(30) Foreign Application Priority Data

Jun. 23, 2022 (TW) ................................. 111123523

(51) Int. Cl.
*G06F 9/44* (2018.01)
*G06F 9/4401* (2018.01)

(52) U.S. Cl.
CPC .................... *G06F 9/4411* (2013.01)

(58) Field of Classification Search
None
See application file for complete search history.

(56) References Cited

U.S. PATENT DOCUMENTS

| 6,263,440 | B1 * | 7/2001 | Pruett | G06F 11/006 |
| | | | | 340/568.1 |
| 8,373,707 | B1 * | 2/2013 | Wyatt | G06F 9/4411 |
| | | | | 345/501 |
| 8,443,116 | B2 * | 5/2013 | Ikeda | G06F 3/14 |
| | | | | 710/17 |
| 9,792,126 | B2 * | 10/2017 | Sakaida | G06T 1/60 |
| 2012/0239918 | A1 * | 9/2012 | Huang | G06F 9/4401 |
| | | | | 713/2 |
| 2013/0169872 | A1 * | 7/2013 | Ko | H04N 21/4432 |
| | | | | 348/553 |

(Continued)

FOREIGN PATENT DOCUMENTS

CN 113127101 A 7/2021

*Primary Examiner* — Danny Chan
(74) *Attorney, Agent, or Firm* — Birch, Stewart, Kolasch & Birch, LLP

(57) ABSTRACT

An electronic system and a display method are provided. The following steps are performed by central processing units: a first central processing unit loads and checks a display firmware; a second central processing unit determines whether the electronic system is in a first connected state based on the display firmware; in response to that the electronic system is in the first connected state, the first central processing unit and the second central processing unit, together with collaborating central processing units of the central processing units, execute a first pre-defined procedure and an external device display procedure based on settings stored in a data area to display a content transmitted by the external device corresponding to the first connected state; and, in response to that the electronic system is not in the first connected state, the first central processing unit executes a second pre-defined procedure.

18 Claims, 6 Drawing Sheets

(56) References Cited

U.S. PATENT DOCUMENTS

| | | | | |
|---|---|---|---|---|
| 2014/0223158 A1* | 8/2014 | Zhou | ............ | G06F 9/4405 |
| | | | | 713/2 |
| 2014/0325201 A1* | 10/2014 | Nam | ............ | G06F 8/65 |
| | | | | 713/2 |
| 2017/0185418 A1* | 6/2017 | Huang | ............ | G06F 8/654 |
| 2017/0245007 A1* | 8/2017 | Huang | ............ | H04N 21/654 |

* cited by examiner

Executing first pre-defined procedure by first central processing unit;
continuing to execute display firmware by second central processing unit;
performing audio processing on external device by third central processing unit;
processing high-bandwidth digital content protection authentication proposed by external device by fourth central processing unit. —S401

Fig. 4

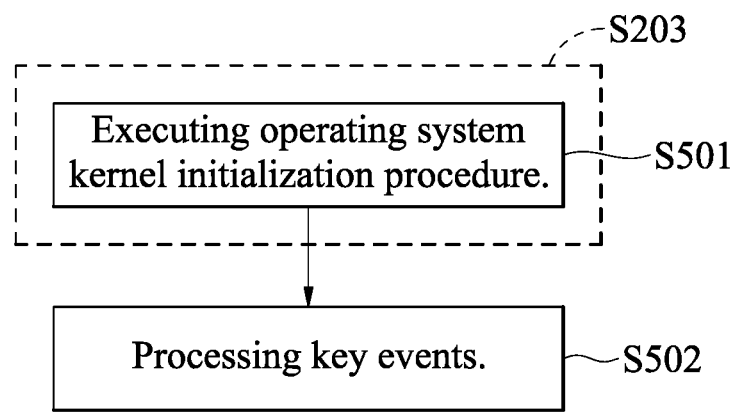

Fig. 5

DISPLAYING CONTENT TRANSMITTED BY AN EXTERNAL DEVICE BASED ON DETECTION OF A CONNECTED STATE BY DISPLAY FIRMWARE

CROSS-REFERENCE TO RELATED APPLICATION

This non-provisional application claims priority under 35 U.S.C. § 119(a) to Patent Application No. 111123523 filed in Taiwan, R.O.C. on Jun. 23, 2022, the entire contents of which are hereby incorporated by reference.

BACKGROUND

Technical Field

The instant disclosure is related to a display technology of external signal sources of an electronic system, especially a quick display technology of external signal sources of the electronic system.

Related Art

General electronic systems known to the inventor have to wait for the operating system thereof to be ready and wait for relevant applications to be run before the electronic systems are able to display data from external signal sources. This process can cause unpleasant user experience.

SUMMARY

As above, some exemplary embodiments of the instant disclosure provide an electronic system, a display method, a computer-readable medium with stored programs, and a non-transitory computer program product to solve current technical issues.

Some embodiments of the instant disclosure provide an electronic system. The electronic system comprises a plurality of central processing units and a first memory. The central processing units comprise a first central processing unit and a second central processing unit. The first memory is configured to store a display firmware. The central processing units are configured to execute the following steps during a boot procedure after the electronic system is powered up: loading and checking the display firmware by the first central processing unit; determining whether the electronic system is in a first connected state by the second central processing unit based on the display firmware; in response to that the electronic system is in the first connected state, executing a first pre-defined procedure and an external device display procedure by the first central processing unit and the second central processing unit together with a plurality of collaborating central processing units of the central processing units, so that a content transmitted by an external device corresponding to the first connected state is displayed, wherein the external device display procedure is executed based on a plurality of settings stored in a data area; and in response to that the electronic system is not in the first connected state, executing a second pre-defined procedure by the first central processing unit.

Some embodiments of the instant disclosure provide a display method. The display method comprises executing the following steps by a plurality of central processing units during a boot procedure after an electronic system is powered up: loading and checking a display firmware by a first central processing unit of the central processing units; determining whether the electronic system is in a first connected state by a second central processing unit of the central processing units based on the display firmware; in response to that the electronic system is in the first connected state, executing a first pre-defined procedure and an external device display procedure by the first central processing unit and the second central processing unit together with a plurality of collaborating central processing units of the central processing units, so that a content transmitted by an external device corresponding to the first connected state is displayed, wherein the external device display procedure is executed based on a plurality of settings stored in a data area; and in response to that the electronic system is not in the first connected state, executing a second pre-defined procedure by the first central processing unit.

Some embodiments of the instant disclosure provide a computer readable medium with stored programs and a non-transitory computer program product. After a processor loads and runs the programs, the processor can execute the aforementioned display method.

As above, for the electronic system, the display method, the computer readable medium with stored programs, and the non-transitory computer program product according to some embodiments of the instant disclosure, the electronic system can quickly display the data transmitted by the external signal sources during the boot procedure after the electronic system is powered up, so that the user experience is improved, and the user does not have to wait for the lengthy boot procedure before the data transmitted by the external signal source is displayed.

BRIEF DESCRIPTION OF THE DRAWINGS

The instant disclosure will become more fully understood from the detailed description given herein below for illustration only, and thus not limitative of the instant disclosure, wherein:

FIG. 4 illustrates a schematic flow chart of a display method according to an exemplary embodiment of the instant disclosure;

FIG. 5 illustrates a schematic flow chart of a display method according to an exemplary embodiment of the instant disclosure;

DETAILED DESCRIPTION

Figure 1:
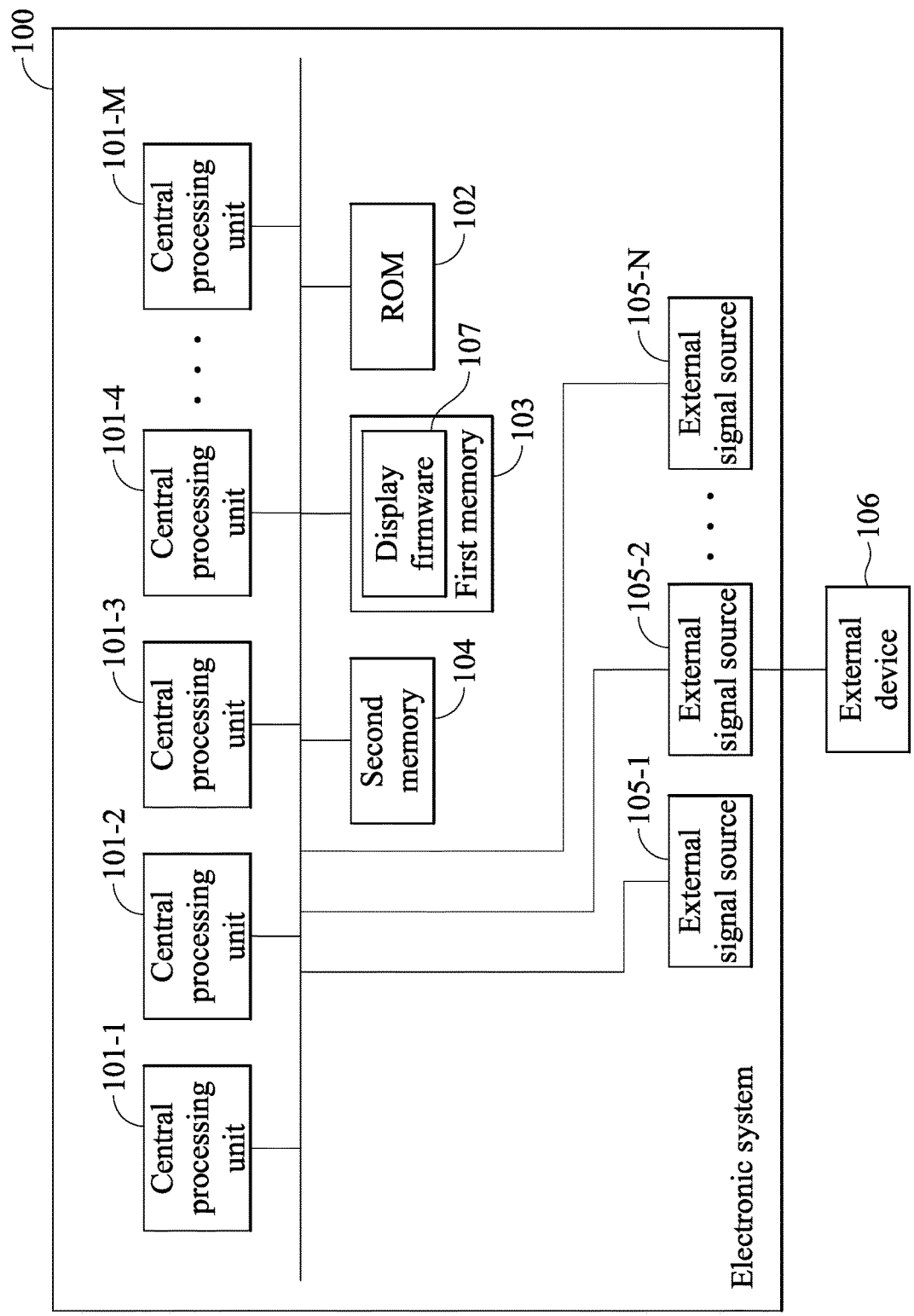
FIG. 1 illustrates a schematic block diagram of an electronic system according to an exemplary embodiment of the instant disclosure.

The foregoing and other technical contents, features, and effects of the instant disclosure can be clearly presented below in detailed description with reference to embodiments of the accompanying drawings. Thicknesses or sizes of the elements in the drawings illustrated in an exaggerated, omitted, or general manner are used to help a person skilled in the art to understand and read, and the size of each element is not the completely actual size and is not intended to limit restraint conditions under which the instant disclosure can be implemented and therefore have no technical significance. Any modification to the structure, change to the proportional relationship, or adjustment on the size should fall within the scope of the technical content disclosed by the instant disclosure without affecting the effects and the objectives that can be achieved by the instant disclosure. In the following detailed description, the terms "couple" or "connect" may refer to any direct or indirect connection and wired or wireless connection.

FIG. 1 illustrates a schematic block diagram of an electronic system 100 according to an exemplary embodiment of the instant disclosure. Please refer to FIG. 1. The electronic system 100 comprises several central processing units 101-1 through 101-M, where M is a positive integer larger than 1. The electronic system 100 also comprises a read only memory (ROM) 102, a first memory 103, a second memory 104, and several external signal sources 105-1 through 105-N, where N is a positive integer larger than 1. An external device 106 can be coupled or connected to the electronic system 100 through the external signal sources 105-1 through 105-N to transmit data to the electronic system 100.

In some embodiments of the instant disclosure, the electronic system 100 is a multicore system-on-chip system, the first memory 103 is a flash memory, the second memory 104 is an internal memory such as, but not limited to, a random-access memory (RAM), the external signal sources 105-1 through 105-N may be, but not limited to, high definition multimedia interfaces (HDMIs), display ports, or type-C connectors, and the external device 106 may be, but not limited to, a camera, a game console, an HDMI player, a personal computer, or a notebook computer.

The electronic system 100 adopts a boot-loader. The boot-loader, also known as the firmware of the electronic system 100, is a program which is run by the electronic system 100 before the operating system kernel runs. The boot-loader executes a boot procedure of the electronic system 100. By activating the boot-loader, the electronic system 100 can initialize a hardware device and establish memory space mapping so as to set hardware and software environments of the electronic system 100 to a suitable state, thus correct hardware and software environments are ready for the operating system kernel.

In this embodiment, the electronic system 100 comprises a multi-stage boot-loader. The code corresponding to a first-stage boot-loader is stored in the ROM 102. After the electronic system 100 is powered up, a central processing unit (the central processing unit 101-1 in this embodiment, will be referred to as a first central processing unit hereinafter for the sake of convenience) of the central processing units 101-1 through 101-M reads the code of the first-stage boot-loader at a fixed position in the ROM 102 and executes the code of the first-stage boot-loader. When the first central processing unit executes the code of the first-stage boot-loader, the first central processing unit copies the code of a second-stage boot-loader to the second memory 104 according to the code of the first-stage boot-loader. Therefore, after the central processing unit 101-1 completes executing the code of the first-stage boot-loader, the central processing unit 101-1 continues to execute the code of the second-stage boot-loader.

In this embodiment, a display firmware 107 is also stored in the first memory 103. The display firmware 107 is used to guide the central processing units 101-1 through 101-M to execute a quick display function. The following will illustrate in detail the display method and the cooperation between the hardware components of the electronic system 100 according to an embodiment of the instant disclosure with the aid of accompanying drawings.

Figure 2:
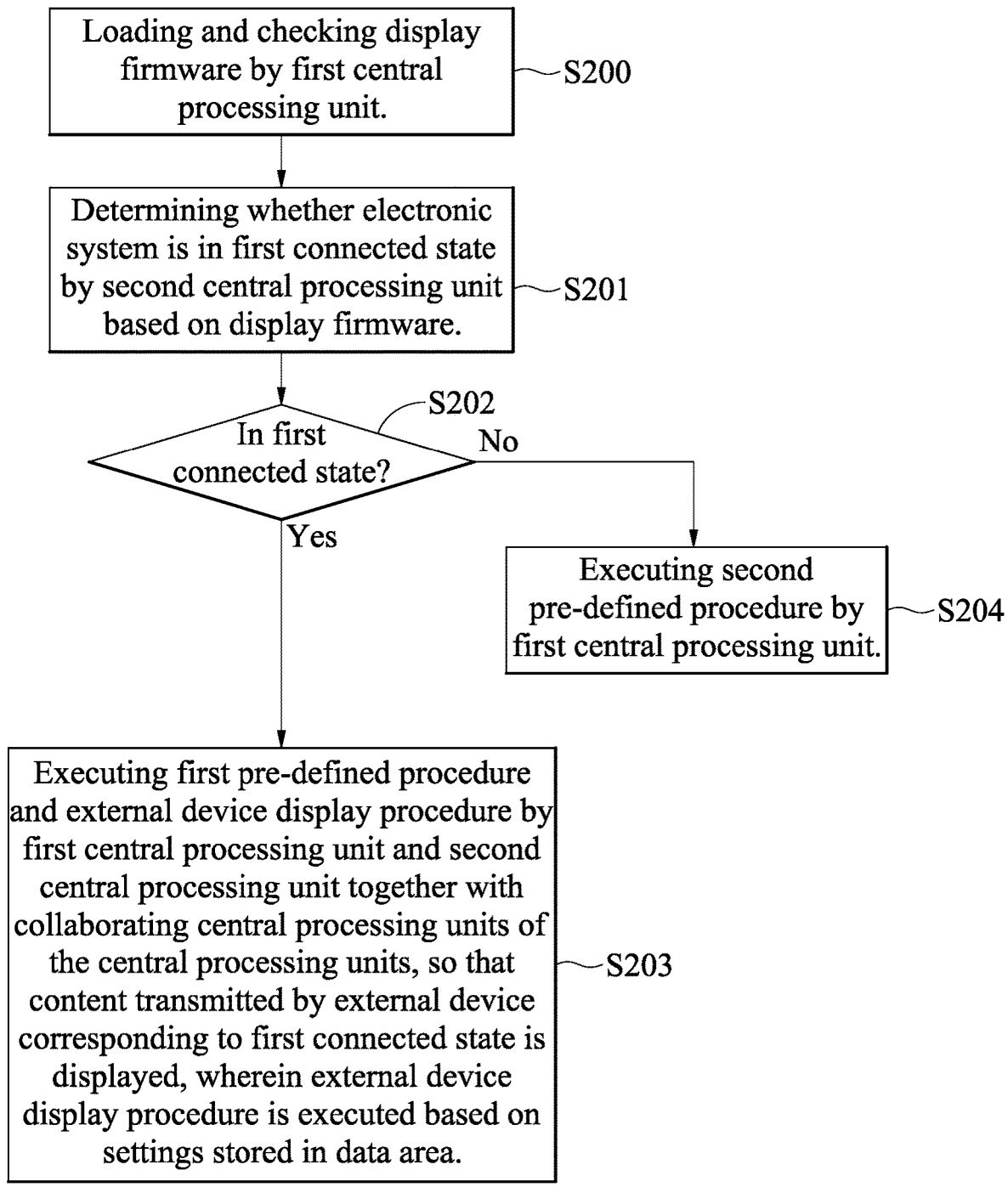
FIG. 2 illustrates a schematic flow chart of a display method according to an exemplary embodiment of the instant disclosure.

FIG. 2 illustrates a schematic flow chart of a display method according to an exemplary embodiment of the instant disclosure. Please refer to FIG. 1 and FIG. 2 at the same time. After the first central processing unit completes executing the code of the first-stage boot-loader and jumps to the code of the second-stage boot-loader, the step S200 is executed. In the step S200, the first central processing unit immediately loads the display firmware 107 from the first memory 103 and checks the display firmware 107. After the first central processing unit loads and checks the display firmware 107 successfully, the first central processing unit wakes the central processing unit 101-2 (will be referred to as the second central processing unit hereinafter for the sake of convenience), and then the second central processing unit executes the display firmware 107.

In the step S201, the second central processing unit (i.e., the central processing unit 101-2) determines whether the electronic system 100 is in a first connected state. In other words, in this embodiment, the second central processing unit determines whether an external device 106 is coupled or connected to the electronic system 100 through the external signal sources 105-1 through 105-N and transmits data to the electronic system 100. In the step S202, if the second central processing unit determines that the electronic system 100 is in the first connected state, the step S203 is executed, or else the step S204 is executed.

In the step S203, the first central processing unit and the second central processing unit together with the other collaborating central processing units of the central processing units 101-1 through 101-M execute a first pre-defined procedure and execute an external device display procedure based on several settings stored in a data area so as to display a content transmitted by the external device 106 corresponding to the first connected state. The settings comprise a signal source identification code, volume settings, an extended display identification data (EDID), and image settings. The data area may be a storage space in the first memory 103. Of course, the data area may also be in another device capable of storing data, as long as the central processing units 101-1 through 101-M can access the device during the boot procedure, and thus the instant disclosure is not limited thereto.

The signal source identification code is used to identify the signal source. The EDID comprises information of the monitor such as monitor resolution, manufacturer's name, and serial number. The image settings comprise settings such as brightness, sharpness, and contrast. The settings will be further illustrated in the following embodiments.

In the step S204, the second central processing unit exits the display firmware 107 and notifies the first central processing unit to execute the second pre-defined procedure. The second pre-defined procedure comprises the original boot procedure and displaying an original preset boot screen.

Figure 3:
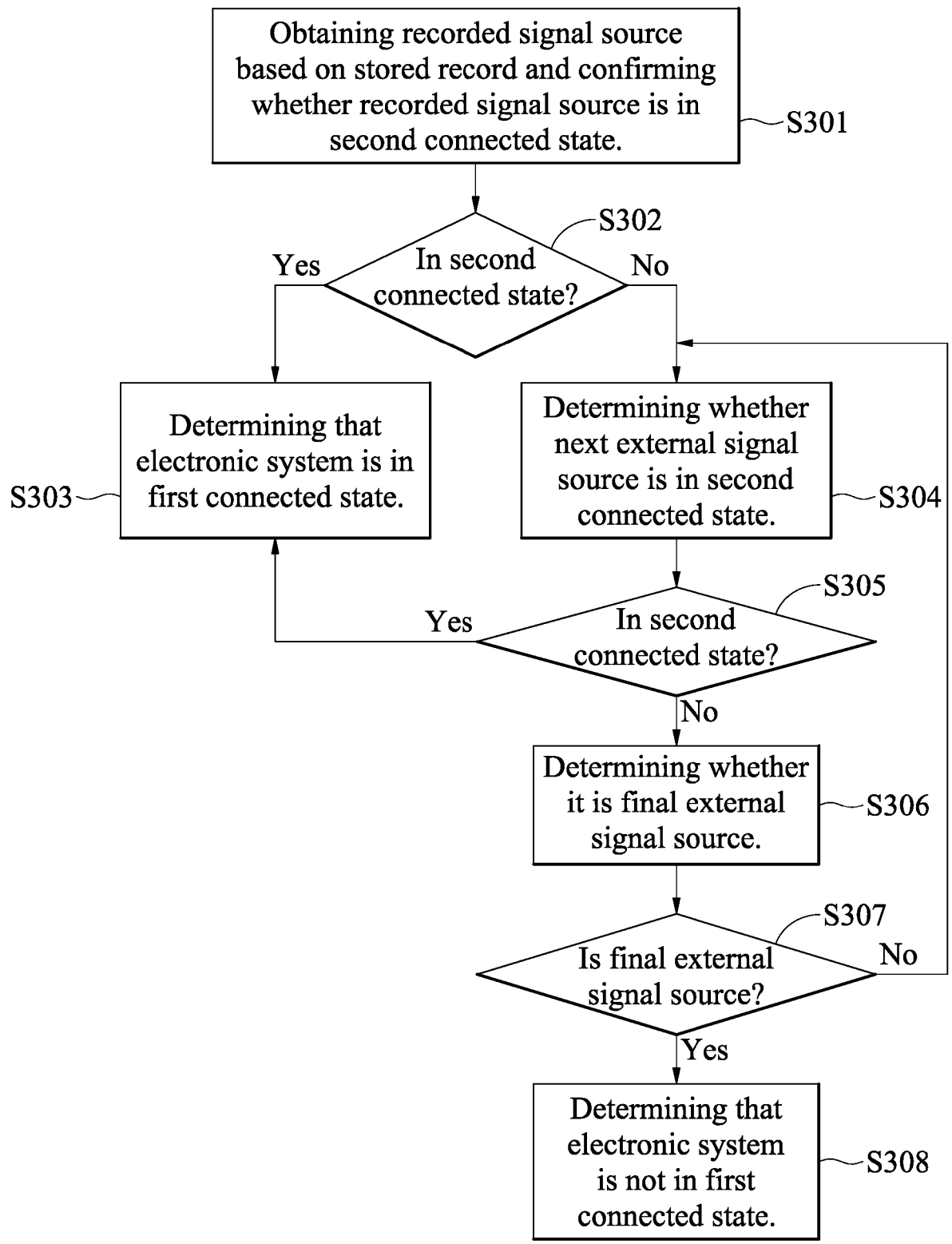
FIG. 3 illustrates a schematic flow chart of a display method according to an exemplary embodiment of the instant disclosure.

FIG. 3 illustrates a schematic flow chart of a display method according to an exemplary embodiment of the instant disclosure. Please refer to FIG. 1 through FIG. 3 at the same time. In this embodiment, the step S201 further comprises the steps S301-S308. In the step S301, in order to determine whether the electronic system 100 is in the first connected state, the second central processing unit (i.e., the central processing unit 101-2) obtains a recorded signal source based on a stored record, where the recorded signal source is the external signal source last played by the electronic system 100 before the electronic system 100 is powered up this time. The recorded signal source is one of the external signal sources 105-1 through 105-N. The second central processing unit also confirms whether the recorded signal source is in a second connected state. In this embodiment, that one of the external signal sources 105-1 through 105-N (such as the external signal source 105-1) is in the second connected state indicates that an external device 106 is connected to this external signal source (i.e., the external signal source 105-1 in this example) and transmits data to the electronic system 100.

For example, before the electronic system 100 is powered up this time, the external device 106 was coupled or connected to the electronic device 100 through the external signal source 105-2 and transmitted video data to the electronic system 100, and the electronic system 100 displayed the video data. The external signal source 105-2 was recorded in the stored record. When the electronic system 100 is powered up again, the external device 106 may be coupled or connected to the electronic system 100 still through the external signal source 105-2, and thus the second central processing unit first determines whether the external device 106 is coupled or connected to the electronic system 100 through the external signal source 105-2 and transmits video data to the electronic system 100 based on the stored record.

In the step S302, if the second central processing unit determines that the recorded signal source is in the second connected state, the step S303 is executed. On the other hand, if the second central processing unit determines that the recorded signal source is not in the second connected state, the step S304 is executed. In the step S303, the second central processing unit determines that the electronic system 100 is in the first connected state.

If the second central processing unit determines that the recorded signal source is not in the second connected state, the second central processing unit determines whether each of the external signal sources 105-1 through 105-N of the electronic system 100 is in the second connected state sequentially based on an external signal source order of the external signal sources 105-1 through 105-N (except the recorded signal source). In the step S304, the second central processing unit determines whether the external signal source with the first order among the external signal sources 105-1 through 105-N is in the second connected state. In the step S305, if the determination in the step S304 comes out positive, the step S303 is executed again, or else the step S306 is executed, where whether the external signal source currently being determined (which is the external signal source with the first order among the external signal sources 105-1 through 105-N now) is the final external signal source is determined. In the step S307, if the external signal source currently being determined is the final external signal source, the step S308 is executed. In the step S308, the first central processing unit determines that the electronic system 100 is not in the first connected state. In the step S307, if the external signal source currently being determined is not the final external signal source, the step S304 is executed again, where whether the external signal source with the second order among the external signal sources 105-1 through 105-N is in the second connected state is determined next. And the following process can be inferred based on the foregoing illustration.

FIG. 4 illustrates a schematic flow chart of a display method according to an exemplary embodiment of the instant disclosure. Please refer to FIG. 1, FIG. 2, and FIG. 4. In this embodiment, the external signal source 105-2 is an HDMI, the external device 106 is connected to the electronic system 100 through the external signal source 105-2, and the external signal source 106 transmits audio signals and high-definition digital images to the electronic system 100.

In this embodiment, the step S203 further comprises the step S401. In the step S401, the first central processing unit executes a first pre-defined procedure, the second central processing unit executes the display firmware 107, the central processing unit 101-3 (referred to as the third central processing unit hereinafter for the sake of convenience) corresponds to the external device 106 and performs audio processing on the audio signals transmitted by the external device 106, and the central processing unit 101-4 (referred to as the fourth central processing unit hereinafter for the sake of convenience) processes a high-bandwidth digital content protection (HBCP) authentication proposed by the external device 106.

The first pre-defined procedure comprises an operating system initialization procedure of the electronic system 100. The first central processing unit executes the operating system initialization procedure so as to prepare correct software and hardware environments for the operating system of the electronic system 100.

In this embodiment, the second central processing unit executes the display firmware 107, and the third central processing unit and the fourth central processing unit respectively process the audio data and an HBCP protocol of the external device 106. This configuration provides a number of technical advantages. Because the third central processing unit is used to process the audio signals transmitted by the external device 106, audio breakups do not happen, and thus the user experience can be noticeably improved. Moreover, because the fourth central processing unit is used to process the HBCP protocol, after the external device 106 proposes the authentication demand, response and authentication process can be completed within a certain amount of time so as to prevent high-quality multimedia contents from being unable to be provided or to prevent basic images from being unable to be outputted. Furthermore, because the third central processing unit and the fourth central processing unit are used to process the audio data and HBCP protocol of the external device 106, the process and time for the operating system initialization procedure of the electronic system 100 are not affected.

FIG. 5 illustrates a schematic flow chart of a display method according to an exemplary embodiment of the instant disclosure. Please refer to FIG. 1, FIG. 2, and FIG. 5. In the embodiment shown in FIG. 5, the operating system initialization procedure comprises an operating system kernel initialization procedure (the step S501). The operating system kernel initialization procedure comprises loading an operating system kernel image from the first memory 103 to the second memory 104 and executing the initialization procedure by the first central processing unit based on the operating system kernel image.

In some embodiments of the instant disclosure, the operating system of the electronic system 100 is Android, and the operating system kernel is the operating system kernel of Android.

In this embodiment, the first pre-defined procedure further comprises processing several key events after the operating system kernel initialization procedure is completed (the step S502).

In some embodiments of the instant disclosure, the operating system of the electronic system 100 is Android, and the key events comprise at least two events selected from the group consisting of a volume up key, a volume down key, a mute key, a home key, a back key, an exit key, and a last key of the electronic system 100. The home key and the back key can make the electronic system 100 jump to displaying the Android user interface, the exit key can make the electronic system 100 exit a current state, and the last key can make the electronic system 100 return from the Android user interface to the current state.

Figure 6:
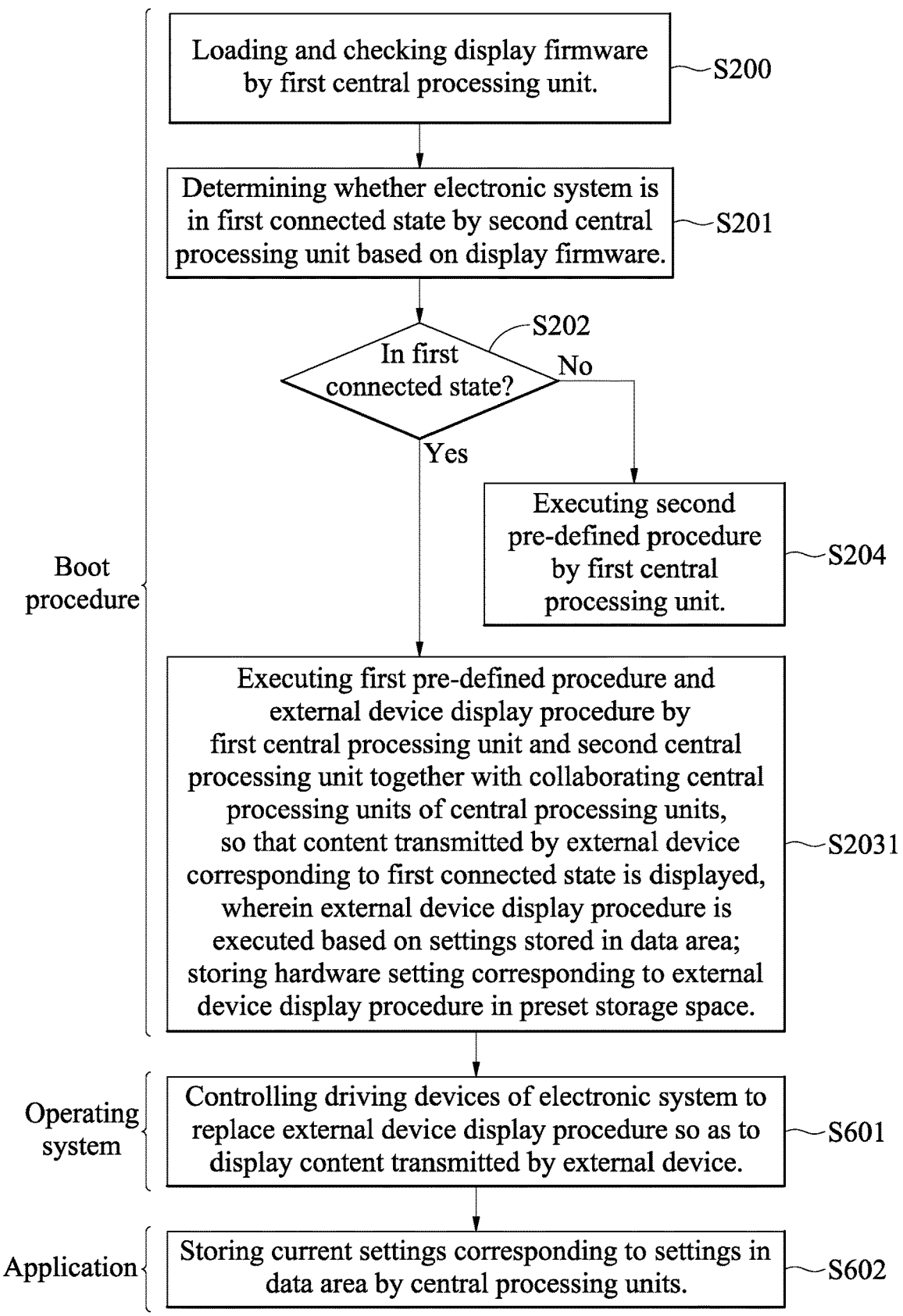
FIG. 6 illustrates a schematic flow chart of a display method according to an exemplary embodiment of the instant disclosure.

FIG. 6 illustrates a schematic flow chart of a display method according to an exemplary embodiment of the instant disclosure. Please refer to FIG. 1, FIG. 2, and FIG. 4, through FIG. 6. Compared with the embodiment shown in FIG. 2, the embodiment shown in FIG. 6 further comprises the step S601 and the step S602, and the step S203 further comprises storing at least one hardware setting corresponding to the external device display procedure in a preset storage space (the step S2031).

In the step S601, after the operating system of the electronic system 100 is ready, the operating system of the electronic system 100 has completed setting all driving devices related to displaying the contents transmitted by the external device 106. Now, the central processing units 101-1 through 101-M control the driving devices related to displaying the contents transmitted by the external device 106 of the electronic system 100 to replace the external device display procedure so as to display the contents transmitted by the external device 106. In the step S602, when an application is run, the central processing units 101-1 through 101-M store several current settings corresponding to the aforementioned settings in the data area.

Figure 7:
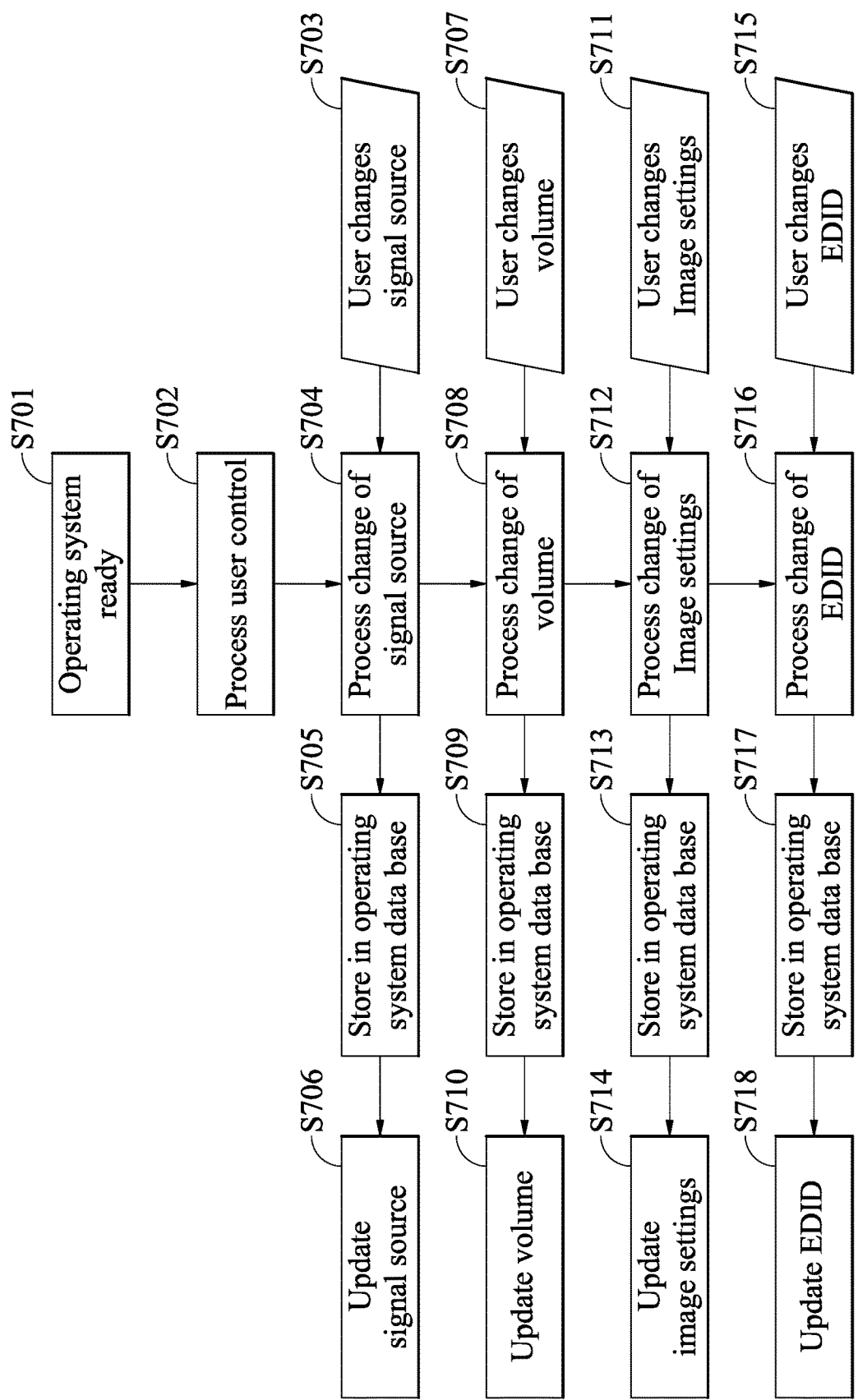
FIG. 7 illustrates a schematic diagram of setting update according to an exemplary embodiment of the instant disclosure.

FIG. 7 illustrates a schematic diagram of setting update according to an exemplary embodiment of the instant disclosure. Please refer to FIG. 1, FIG. 6, and FIG. 7. In this embodiment, the settings comprise the signal source identification code, the volume settings, the EDID, and the image settings. After the operating system is ready (the step S701), when the central processing units 101-1 through 101-M detect that the driving devices related to displaying the contents transmitted by the external device 106 are ready, the central processing units 101-1 through 101-M control the driving devices related to displaying the contents transmitted by the external device 106 of the electronic system 100 to replace the external device display procedure so as to display the contents transmitted by the external device 106. Besides, when the application is run, the central processing units 101-1 through 101-M process user controls (the step S702).

Take the embodiment where the fourth central processing unit processes the HBCP authentication proposed by the external device 106 as an example, after the operating system is ready (the step S701), if the fourth central processing unit detects that an HBCP driving device is ready (notified by the operating system), the fourth central processing unit stops the HBCP authentication, and the HBCP driving device replaces the fourth central processing unit to process the HBCP authentication.

Every time the user changes the signal source (the step S703), the central processing units 101-1 through 101-M process the change of the signal source (the step S704), and the central processing units 101-1 through 101-M also store the change of the signal source in an operating system database (the step S705) and update the signal source identification code at the data area (the step S706). Every time the user changes the volume (the step S707), the central processing units 101-1 through 101-M process the change of the volume (the step S708), and the central processing units 101-1 through 101-M also store the change of the volume in the operating system database (the step S709) and update the volume at the data area (the step S710). Every time the user changes the image settings (the step S711), the central processing units 101-1 through 101-M process the change of the image settings (the step S712), and the central processing units 101-1 through 101-M also store the change of the image settings in the operating system database (the step S713) and update the image settings at the data area (the step S714). Every time the user changes the EDID (the step S715), the central processing units 101-1 through 101-M process the change of the EDID (the step S716), and the central processing units 101-1 through 101-M also store the change of the EDID in the operating system database (the step S717) and update the EDID at the data area (the step S718).

In this embodiment, because the settings corresponding to the user's preferences are stored in the data area, when the central processing units 101-1 through 101-M execute the external device display procedure in the step S2031 so as to display contents transmitted by the external device 106 corresponding to the first connected state, the displayed image and audio do not deviate too much from the user's preference, and thus the user does not feel abrupt about the displayed image and audio. When the central processing units 101-1 through 101-M control the driving devices related to displaying the contents transmitted by the external device 106 of the electronic system 100 in the step S601 to replace the external device display procedure so as to display the contents transmitted by the external device 106, the image and the audio will not be noticeably changed.

Please refer to FIG. 1, FIG. 6, and FIG. 7. In some embodiments of the instant disclosure, the first pre-defined procedure in the step S2031 comprises the operating system initialization procedure of the electronic system 100, and the operating system initialization procedure comprises the operating system kernel initialization procedure. The first pre-defined procedure further comprises processing several key events after the operating system kernel initialization procedure is completed. The key events comprise at least two events selected from the group consisting of the volume up key, the volume down key, the mute key, the home key, the back key, the exit key, and the last key of the electronic system 100. The user can adjust the electronic system 100 through the volume up key, the volume down key, the mute key, the home key, the back key, the exit key, and the last key. The central processing units 101-1 through 101-M record these adjustments and synchronize these adjustments with the operating system of the electronic system 100 after the operating system of the electronic system 100 is ready. Therefore, when the central processing units 101-1 through 101-M control the driving devices related to displaying the contents transmitted by the external device 106 of the electronic system 100 to replace the external device display procedure so as to display the contents transmitted by the external device 106, the image and the audio will not be changed suddenly.

In some embodiments of the instant disclosure, the central processing units 101-1 through 101-M record the adjustments in a storage space such as, but not limited to, an idle register or a memory.

In some embodiments of the instant disclosure, the data area is located in the first memory 103. After the operating system of the electronic system 100 is ready, the number of the settings will become greater and greater along with the operations inputted by the user; the number of filesystems is also greater after the operating system of the electronic system 100 is ready, and thus the access format (such as the fourth extended filesystem, ext4) may not be readily accessible when the central processing units 101-1 through 101-M execute the external device display procedure. Consequently, in this embodiment, the settings (such as the signal source identification code, the volume settings, the EDID, and the image settings) are stored in the data area in a structure format provided by an adopted programming language. After the settings are read into a preset memory space of the second memory 104, the central processing units 101-1 through 101-M access the settings based on a structure pointer corresponding to the preset memory space.

Take C (C programming language) as an example, the structure keyword "struct" provided by C can be used in the following way:

typedef struct
{
    type1 signal source identification code;
    type2 volume settings;
    type3 EDID;
    type4 image settings;
}setting;

Next, a function fwrite( ) provided by C can be used to write the structure data into the data area of the first memory 103. When the central processing units 101-1 through 101-M execute the external device display procedure, a function fread( ) provided by C can be used to read the structure data stored in the data area of the first memory 103 and place the structure data in a preset memory space of the second memory 104, and a structure pointer (such as "ptr" defined by the code "setting *ptr;") can be used to point to the preset memory space, and then the settings can be accessed through the structure pointer (such as by using the code "ptr→volume settings;"). It is worth mentioning that, although the foregoing embodiment adopts C as an example, other programming languages can be used to achieve the same function, and thus the instant disclosure is not limited thereto.

Please refer to FIG. 1. The ROM 102, the first memory 103, and the second memory 104 are used to store programs. The programs may comprise codes, and the codes may comprise computer operation instructions. The ROM 102, the first memory 103, and the second memory 104 provide instructions and data to the central processing units 101-1 through 101-M. The central processing units 101-1 through 101-M read corresponding computer programs at the ROM 102 and the first memory 103 and then run the computer programs at the second memory 104. Specifically, in this embodiment, the central processing units 101-1 through 101-M are used to execute the steps illustrated in FIG. 2 through FIG. 7.

The central processing units 101-1 through 101-M may be a homogeneous multicore structure or a heterogeneous multicore structure.

In some embodiments of the instant disclosure, a computer-readable medium with stored programs is further provided. The computer-readable medium stores at least one instruction. When the at least one instruction is executed by the central processing units 101-1 through 101-M of the electronic system 100, the at least one instruction can enable the central processing units 101-1 through 101-M of the electronic system 100 to execute the steps illustrated in FIG. 2 through FIG. 7.

The recording medium of a computer may be, but is not limited to, a phase-change memory (PRAM), a static random access memory (SRAM), a dynamic random access memory (DRAM), other types of random access memories (RAMs), a read-only memory (ROM), an electrically erasable programmable read-only memory (EEPROM), a flash memory, other internal memory technologies, a CD-ROM, a DVD, other optical storages, a cassette tape, a tape drive, other magnetic storage device, or other non-transmission media, and the recording medium can be used to store data that can be accessed by a computing device. According to the definition in the instant disclosure, the computer readable medium excludes a transitory medium such as modulated data signal and carrier wave. In some embodiments of the instant disclosure, a non-transitory computer program product is further provided. The non-transitory computer program product stores at least one instruction. When the at least one instruction is executed by the central processing units 101-1 through 101-M of the electronic system 100, the at least one instruction can enable the central processing units 101-1 through 101-M of the electronic system 100 to execute the steps illustrated in FIG. 2 through FIG. 7.

As above, for the electronic system, the display method, the computer-readable medium with stored programs, and the non-transitory computer program product provided by some embodiments of the instant disclosure, the electronic system can quickly display the data transmitted by the external signal sources during the boot procedure after the electronic system is powered up, so that the user experience is improved, and the user does not have to wait for the lengthy boot procedure before the data transmitted by the external signal source is displayed. Besides, in one or some embodiments, because the settings corresponding to the user's preferences of the electronic system in the previous time are stored in the data area and then used, when the external device display procedure is executed, the displayed image and audio do not deviate too much from the user's preference, and thus the user does not feel abrupt about the displayed image and audio. Further, when the driving device replaces the external device display procedure, the image and the audio will not be noticeably changed.

Although the technical context of the instant disclosure has been disclosed using the exemplary embodiments above, the exemplary embodiments are not meant to limit the instant disclosure. Any alteration and retouch made by persons skilled in the art without deviating from the spirit of the instant disclosure shall fall into the scope of the instant disclosure. The scope of protected invention shall be defined by the claims below.

What is claimed is:

1. An electronic system comprising:
    a plurality of central processing units comprising a first central processing unit and a second central processing unit; and
    a first memory configured to store a display firmware;
    wherein the central processing units are configured to execute the following steps during a boot procedure after the electronic system is powered up:
    (a) loading and checking the display firmware by the first central processing unit;
    (b) determining whether the electronic system is in a first connected state by the second central processing unit based on the display firmware;
    (c) in response to that the electronic system is in the first connected state, executing a first pre-defined procedure and an external device display procedure by the first central processing unit and the second central processing unit together with a plurality of collaborating central processing units of the central processing units, so that a content transmitted by an external device corresponding to the first connected state is displayed, wherein the external device display procedure is executed based on a plurality of settings stored in a data area; and (d) in response to that the electronic system is not in the first connected state, executing a second pre-defined procedure by the first central processing unit, wherein the external device is coupled to the electronic system through a high definition multimedia interface, and the step (c) comprises:

executing the first pre-defined procedure by the first central processing unit;

performing audio processing on the external device by a third central processing unit of the central processing units; and processing a high-bandwidth digital content protection authentication proposed by the external device by a fourth central processing unit of the central processing units.

2. The electronic system according to claim 1, wherein the first pre-defined procedure comprises an operating system initialization procedure of the electronic system.

3. The electronic system according to claim 2, wherein the operating system initialization procedure comprises an operating system kernel initialization procedure, and the first pre-defined procedure further comprises processing a plurality of key events after the operating system kernel initialization procedure is completed.

4. The electronic system according to claim 3, wherein the key events comprise at least two events selected from the group consisting of a volume up key, a volume down key, a mute key, a home key, a back key, an exit key, and a last key of the electronic system.

5. The electronic system according to claim 1, wherein the step (b) comprises:

obtaining a recorded signal source based on a stored record by the second central processing unit and confirming whether the recorded signal source is in a second connected state by the second central processing unit;

in response to that the recorded signal source is in the second connected state, determining that the electronic system is in the first connected state by the second central processing unit based on the display firmware; and in response to that the recorded signal source is not in the second connected state:

determining whether each of a plurality of external signal sources of the electronic system is in the second connected state by the second central processing unit sequentially based on an external signal source sequence;

in response to that any of the external signal sources is in the second connected state, determining that the electronic system is in the first connected state by the second central processing unit; and in response to that the external signal sources are not in the second connected state, determining that the electronic system is not in the first connected state by the second central processing unit.

6. The electronic system according to claim 5, wherein that the recorded signal source is in the second connected state indicates that the recorded signal source is connected to a first external device, and the first external device transmits data to the electronic system; and that any of the external signal sources is in the second connected state indicates that one of the external signal sources is connected to a second external device, and the second external device transmits data to the electronic system.

7. The electronic system according to claim 1, wherein the electronic system comprises a second memory, the settings are stored in the data area in a structure format, and after the settings are read into a preset memory space of the second memory, the central processing units access the settings based on a structure pointer corresponding to the preset memory space.

8. The electronic system according to claim 1, wherein the step (c) comprises storing at least one hardware setting corresponding to the external device display procedure in a preset storage space; the plurality of central processing units are configured to execute the following after the step (c):

after an operating system is ready, controlling a plurality of driving devices of the electronic system to replace the external device display procedure so as to display a content transmitted by the external device corresponding to the first connected state; and when an application is run, storing a plurality of current settings corresponding to the settings in the data area.

9. A display method applicable for an electronic system, wherein the electronic system comprises a plurality of central processing units and a first memory, the central processing units comprise a first central processing unit and a second central processing unit, the first memory is configured to store a display firmware, and the method comprises executing the following steps by the central processing units during a boot procedure after the electronic system is powered up:

(a) loading and checking the display firmware by the first central processing unit;

(b) determining whether the electronic system is in a first connected state by the second central processing unit based on the display firmware;

(c) in response to that the electronic system is in the first connected state, executing a first pre-defined procedure and an external device display procedure by the first central processing unit and the second central processing unit together with a plurality of collaborating central processing units of the central processing units, so that a content transmitted by an external device corresponding to the first connected state is displayed, wherein the external device display procedure is executed based on a plurality of settings stored in a data area; and (d) in response to that the electronic system is not in the first connected state, executing a second pre-defined procedure by the first central processing unit, wherein the external device is coupled to the electronic system through a high definition multimedia interface, and the step (c) comprises:

executing the first pre-defined procedure by the first central processing unit;

performing audio processing on the external device by a third central processing unit of the central processing units; and processing a high-bandwidth digital content protection authentication proposed by the external device by a fourth central processing unit of the central processing units.

10. The method according to claim 9, wherein the first pre-defined procedure comprises an operating system initialization procedure of the electronic system.

11. The method according to claim 10, wherein the operating system initialization procedure comprises an operating system kernel initialization procedure, and the first pre-defined procedure further comprises processing a plurality of key events after the operating system kernel initialization procedure is completed.

12. The method according to claim 11, wherein the key events comprise at least two events selected from the group consisting of a volume up key, a volume down key, a mute key, a home key, a back key, an exit key, and a last key of the electronic system.

13. The method according to claim 9, wherein the step (b) comprises executing the following by the second central processing unit:
 obtaining a recorded signal source based on a stored record and confirming whether the recorded signal source is in a second connected state;
 in response to that the recorded signal source is in the second connected state, determining that the electronic system is in the first connected state based on the display firmware; and
 in response to that the recorded signal source is not in the second connected state:
 determining whether each of a plurality of external signal sources of the electronic system is in the second connected state sequentially based on an external signal source sequence;
 in response to that any of the external signal sources is in the second connected state, determining that the electronic system is in the first connected state; and
 in response to that the external signal sources are not in the second connected state, determining that the electronic system is not in the first connected state.

14. The method according to claim 13, wherein that the recorded signal source is in the second connected state indicates that the recorded signal source is connected to a first external device, and the first external device transmits data to the electronic system; and that any of the external signal sources is in the second connected state indicates that one of the external signal sources is connected to a second external device, and the second external device transmits data to the electronic system.

15. The method according to claim 9, wherein the settings comprise a signal source identification code, a volume setting, an extended display identification data, and an image setting.

16. The method according to claim 9, wherein the second pre-defined procedure comprises displaying a preset boot screen.

17. The method according to claim 9, wherein the electronic system comprises a second memory, the settings are stored in the data area in a structure format, and after the settings are read into a preset memory space of the second memory, the central processing units access the settings based on a structure pointer corresponding to the preset memory space.

18. The method according to claim 9, wherein the step (c) comprises storing at least one hardware setting corresponding to the external device display procedure in a preset storage space, and the method further comprises:
 after an operating system is ready, controlling a plurality of driving devices of the electronic system by the central processing units to replace the external device display procedure so as to display a content transmitted by the external device corresponding to the first connected state; and
 when an application is run, storing a plurality of current settings corresponding to the settings in the data area by the central processing units.

* * * * *